United States Patent
Weil et al.

(10) Patent No.: US 8,479,777 B2
(45) Date of Patent: Jul. 9, 2013

(54) LOW TEMPERATURE, HIGH PRESSURE RUBBER HOSE

(75) Inventors: Andreas Weil, Mentor, OH (US); Victor Ihama, University Heights, OH (US); Philip J. Novak, Aurora, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 43 days.

(21) Appl. No.: 13/119,536

(22) PCT Filed: Nov. 19, 2009

(86) PCT No.: PCT/US2009/065091
§ 371 (c)(1),
(2), (4) Date: Mar. 17, 2011

(87) PCT Pub. No.: WO2010/059791
PCT Pub. Date: May 27, 2010

(65) Prior Publication Data
US 2011/0168272 A1 Jul. 14, 2011

Related U.S. Application Data

(60) Provisional application No. 61/116,926, filed on Nov. 21, 2008.

(51) Int. Cl.
*F16L 11/00* (2006.01)
(52) U.S. Cl.
USPC ........ 138/126; 138/127; 138/138; 428/36.91; 428/36.9
(58) Field of Classification Search
USPC ................. 138/129, 130, 140, 172; 428/36.9, 428/36.91
See application file for complete search history.

(56) References Cited

U.S. PATENT DOCUMENTS

| | | | |
|---|---|---|---|
| 4,417,603 A | 11/1983 | Argy | |
| 4,870,995 A | 10/1989 | Igarashi et al. | |
| 5,269,349 A | 12/1993 | Sugier et al. | |
| 5,406,984 A | 4/1995 | Sugier et al. | |
| 6,065,540 A | 5/2000 | Thomeer et al. | |
| 6,170,532 B1 | 1/2001 | Campbell | |
| 6,186,181 B1 | 2/2001 | Schippl | |
| 6,607,010 B1 | 8/2003 | Kashy | |
| 6,679,294 B1 | 1/2004 | Ringelberg et al. | |
| 6,679,295 B2 | 1/2004 | Daikai et al. | |
| 6,770,372 B2 | 8/2004 | Lasson et al. | |
| 6,889,716 B2 | 5/2005 | Lundberg et al. | |
| 7,059,354 B2 | 6/2006 | Ikemoto et al. | |
| 7,143,789 B2 | 12/2006 | Nagy et al. | |
| 7,243,686 B2 | 7/2007 | Burke et al. | |
| 2003/0106325 A1 | 6/2003 | Robbie | |
| 2004/0025520 A1 | 2/2004 | Robbie | |
| 2005/0000582 A1 | 1/2005 | Okado et al. | |

(Continued)

FOREIGN PATENT DOCUMENTS

| | | |
|---|---|---|
| EP | 0 459 019 A2 | 12/1991 |
| WO | 02061317 A2 | 8/2002 |
| WO | 02076734 A1 | 10/2002 |
| WO | 2007020503 A2 | 2/2007 |

*Primary Examiner* — Patrick F Brinson
(74) *Attorney, Agent, or Firm* — John A. Molnar, Jr.

(57) ABSTRACT

Flexible reinforced rubber hose adapted for conveying fluids under low temperatures and high pressures. The hose includes a inner tube formed of an acrylonitrile butadiene rubber (NBR) or other low temperature rubber compound having an elastic modulus of not greater than about 8.4 MPa (1200 psi), and an outer jacket formed of a chloroprene rubber (CR) or other low temperature rubber compound having a durometer of not greater than about 75 Shore A.

16 Claims, 2 Drawing Sheets

U.S. PATENT DOCUMENTS

| | | |
|---|---|---|
| 2005/0183785 A1 | 8/2005 | Lundberg et al. |
| 2006/0011250 A1 | 1/2006 | Ikemoto et al. |
| 2006/0042711 A1 | 3/2006 | Hibino et al. |
| 2006/0124189 A1 | 6/2006 | Burke et al. |
| 2007/0079884 A1 | 4/2007 | Tomerlin et al. |
| 2007/0235100 A1 | 10/2007 | Tomerlin et al. |
| 2007/0277896 A1 | 12/2007 | Takagi et al. |

# LOW TEMPERATURE, HIGH PRESSURE RUBBER HOSE

CROSS-REFERENCE TO RELATED APPLICATIONS

The present application claims the benefit of the filing date of U.S. Provisional Application Ser. No. 61/116,926, filed Nov. 21, 2008, the disclosure of which is expressly incorporated herein by reference

BACKGROUND OF THE INVENTION

The present invention relates broadly to flexible rubber hoses for low, medium, and, particularly, high pressure applications, and more particularly to a construction therefor for use at low service temperatures.

Flexible rubber hose is used in a variety of hydraulic and other fluid transfer applications for conveying fluid pressures which for "high" pressure applications may range up to about 8000 psi (55 MPa) or more. In basic construction, hoses of the type herein involved typically are formed as having an inner tube or core surrounded by one or more outer layers of a braided or spiral-wound reinforcement material which may be a metal or metal-alloy wire or a natural or synthetic fiber. The reinforcement layers, in turn, are protected by a surrounding outermost jacket or cover which may be of the same or different material as the inner tube. The cover provides the hose with increased abrasion resistance and also helps to protect the hose from being damaged by external forces.

In the case of "rubber," as opposed to thermoplastic, hose constructions, the inner tube may be provided as formed of a vulcanizable natural or, more typically, a synthetic rubber material such as Buna-N or Neoprene. Such material or blend may be conventionally extruded and cooled or cured to form the inner tube. As is detailed in U.S. Pat. Nos. 3,116,760; 3,159,183; 3,966,238; and 4,952,262, if necessary, the tube may be cross-head extruded over a mandrel for support, or otherwise supported in later forming operations using air pressure and/or reduced processing temperatures.

From the extruder, the inner tube may be delivered through a braider and/or a spiral winder for its reinforcement with one or more surrounding layers of a wire and/or fibrous material or blend such as a monofilament, yarn, cord, or yarn-wire composite. As is described in Japanese (Kokai) Publ. No. 10-169854 A2, Canadian Patent No. 973,074, and U.S. Pat. Nos. 3,654,967; 3,682,201; 3,790,419; 3,861,973; 3,905,398; 4,007,070; 4,064,913; 4,343,333; and 4,898,212, these reinforcement layers are applied under tension and typically may be formed of an interwoven braid or a spiral winding of a nylon, polyester, polyphenylene benzobisoxazole, polyvinyl acetate, liquid crystal polymer (LCP), or para-, meta-, or other aramid yarn, or a high tensile steel or other metal wire. A bonding or other interlayer of a vulcanizable rubber may be extruded or otherwise applied between each of the reinforcement layers to bond each successive layer to the next layer.

Following the braiding, winding, or other application of the reinforcement layers and the interlayers, an outer cover or sheath optionally may be applied. Such cover, which may be formed as a cross-head extrusion, a moisture-cured or solvent-based dipped coating, or a spiral-wound wrapping, typically comprises an abrasion-resistant synthetic rubber or a thermoplastic such as a polyurethane. Following the application of the cover, the hose construction so-formed is heated to vulcanize the rubber layers and thereby consolidate the construction into an integral hose structure. Representative hose constructions, as well as manufacturing methods and materials therefor, are shown in U.S. Pat. Nos. 3,921,674; 3,953,270; 3,994,761; 4,104,098; 4,238,260; 4,759,388; 6,037,025; 6,474,366 and 7,143,789.

In normal use, such as in mobile or industrial hydraulic applications, hoses of the type herein involved may be exposed to a variety of environmental factors and mechanical stresses which cannot always be predicted. Of utmost importance to the integrity and performance of the hose is that a strong bond is achieved between the constituent parts thereof. However, while it is important to bond these parts together, it is also important that the hose not be made overly stiff so as to make it prone to kinking or fatigue or otherwise unusable for certain applications.

In view of the foregoing, it will be appreciated that hose constructions must exhibit a demanding balance of chemical and physical properties. Indeed, industry standards such as Society of Automotive Engineers (SAE) 100R12, 100R13, and 100R15, International Organization for Standardization (ISO) 3862 Types R12, R13, R15, 4SH, and 4SP, and European Standard EN 856 Types R12, R13, 4SH and 4SP specify a service temperature ranging from −40° C. (−40° F.) to +125° C. (+257° F.). The service pressure for hoses of such types vary by specification and hose diameter, but typically range from 17.5 MPa (2500 psi) to 42.0 MPa (6000 psi).

As commercial applications for hoses continue to increase, it is believed that improvements in hose constructions would be well-received by numerous industries for a variety of mobile and industrial application. Especially desired would be a construction which is flexible and light-weight, and which is resistant to low temperatures so as to meet various industrial standards.

BROAD STATEMENT OF THE INVENTION

The present invention is directed to flexible rubber hoses, and particularly to a construction therefor which results in a hose which is resistant to low temperatures, but which is still flexible. Such construction may be adapted for use in a variety of applications such as mobile or industrial hydraulic installations specifying service temperatures ranging from about −57° C. (−70° F.) to +100° C. (+212° F.) and maximum service pressures exceeding about 28.0 MPa (4000 psi) and up to about 56.0 MPa (8000 psi).

The hose of the present invention is constructed as having an inner tube or core formed of a nitrile butadiene rubber (NBR) or other such rubber compound formulated for low temperature use such as having an elastic modulus (at 100% elongation) of not greater than about 1200 psi (8.4 MPa) and, preferably, not less than about 500 psi (3.4 MPa), and a durometer of not greater than about 80 Shore A and, preferably, not less than about 70 Shore A. The hose further is constructed as having an outer cover or jacket formed of chloroprene rubber (CR) or other such rubber compound similarly formulated for low temperature use such as having a durometer of not greater than about 75 Shore A and, preferably, not less than about 60 Shore A, an elongation at break of not less than about 160% and, preferably, not greater than about 500%, and a tensile strength of not greater than about 2500 psi (17.2 MPa) and, preferably, not less than about 1600 psi (11.0 MPa). Such construction results in a hose which remains flexible enough to be serviceable at temperatures as low as −57° C. (−70° F.), but which also has enough abrasion resistance to withstand normal usage in a variety of hydraulic and other applications. Such construction also allows for the hose to be wire spiral reinforced so as to meet maximum service pressure requirements of up to about 56.0 MPa (8000 psi).

In an illustrated embodiment, the hose construction of the present invention includes the aforementioned inner core over which, for example, at least a pair of metal or metal alloy wire reinforcement layers are spiral wound to provide resistance to internal working pressures of 4000 psi (28 MPa) or more. The aforementioned jacket is provided over the reinforcement layers. Each reinforcement layer may be bonded to the next adjacent reinforcement layer by a rubber or other interlayer interposed therebetween, with the inner tube being bonded to the innermost reinforcement layer, and the cover being bonded to the outermost reinforcement layer. That is, the rubber layers of the hose as so formed may be vulcanized to bond each layer in the hose wall to the next adjacent layer to thereby consolidate the layers into an integral hose wall structure.

The present invention, accordingly, comprises the construction, combination of elements, and/or arrangement of parts and steps which are exemplified in the detailed disclosure to follow. Advantages of the present invention include a hose construction which is economical to manufacture, and which may be spiral wire reinforced as otherwise adapted for use in a variety of mobile or industrial hydraulic or other applications requiring maximum service pressures exceeding about 28.0 MPa (4000 psi) and up to about 56.0 MPa (8000 psi). Additional advantage include a hose which retains a bend radius or other flexibility at service temperatures as low as about −57° C. (−70° F.). These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
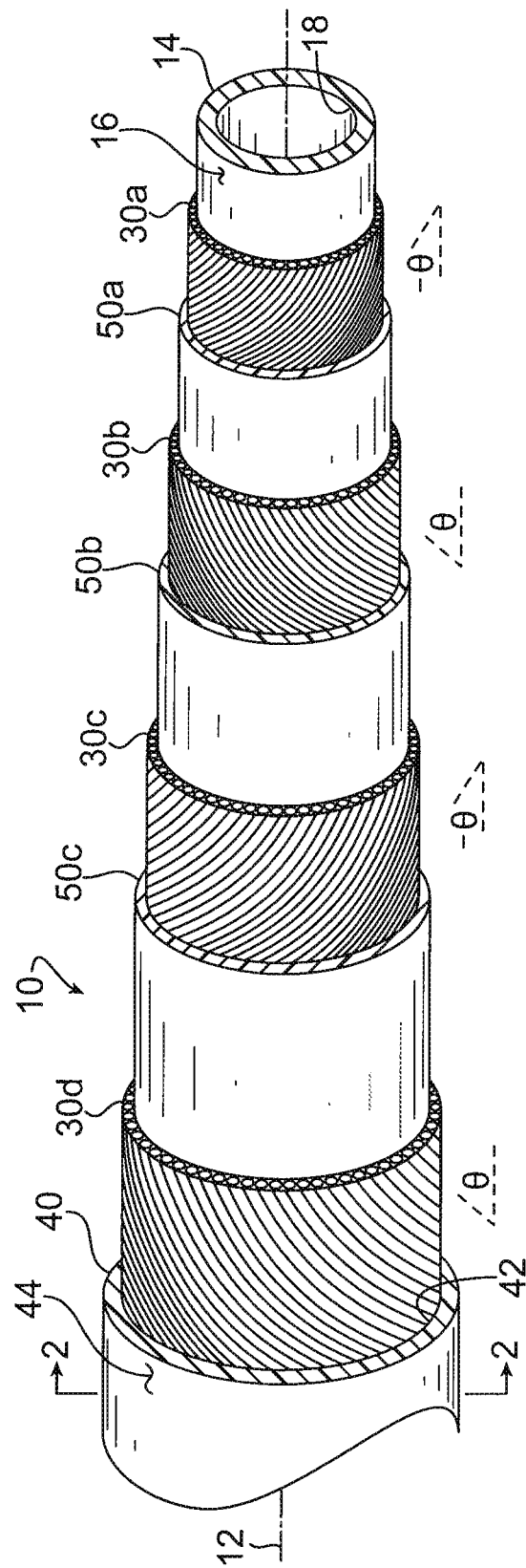
FIG. 1 is a side elevation, cut-away view of a representative low temperature, high pressure rubber hose construction according to the present invention.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

For illustration purposes, the precepts of the low temperature rubber hose construction herein involved are described in connection with its configuration as particularly adapted for use in high pressure, i.e., between about 4000-8000 psi (28-56 MPa) mobile or industrial hydraulic applications. It will be appreciated, however, that aspects of the present invention may find use in other hose constructions for a variety or general hydraulic or other fluid transfer applications. Use within those such other applications therefore should be considered to be expressly within the scope of the present invention.

Figure 2:
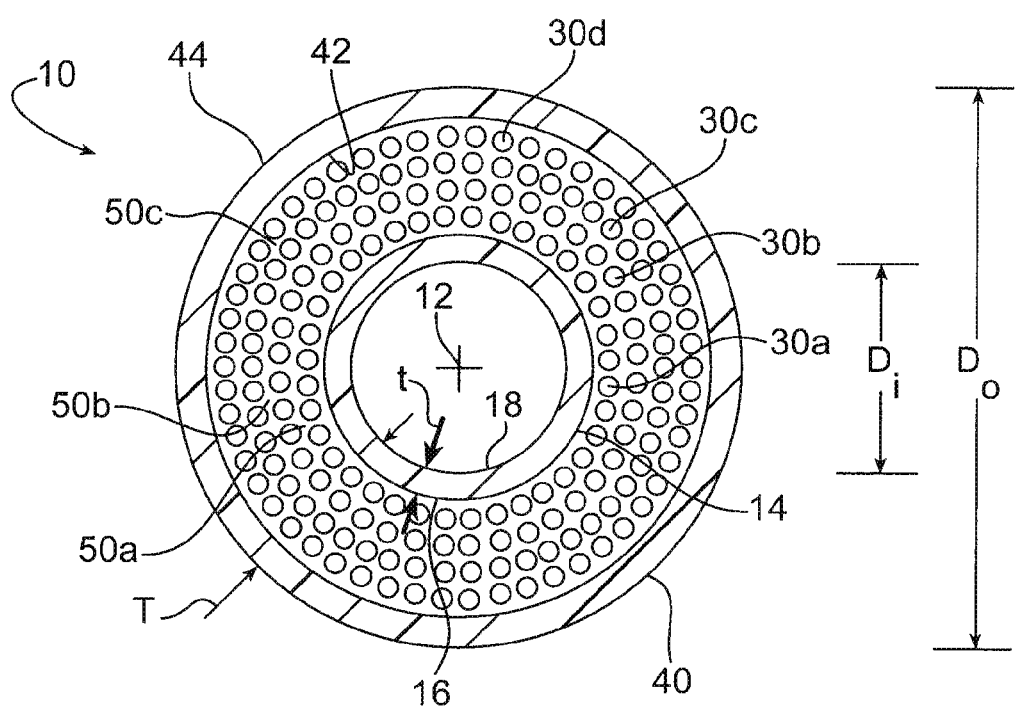
FIG. 2 is a radial cross-sectional view of the hose of FIG. 1 taken through line 2-2 of FIG. 1.

Referring then to the figures wherein corresponding reference characters are used to designate corresponding elements throughout the several views with equivalent elements being referenced with prime or sequential alphanumeric designations, a representative hose construction according to the present invention is shown generally at 10 in the cut-away view of FIG. 1 and in the radial cross-sectional view of FIG. 2. In basic dimensions, hose 10 extends axially to an indefinite length along a central longitudinal axis, 12, and has a select inner and outer diameter referenced, respectively, at "$D_i$" and "$D_o$" in the radial cross-sectional view of FIG. 2. The inner and outer diameter dimensions may vary depending upon the particular fluid conveying application involved, but generally for many high pressure hydraulic applications will be between about 0.25-2 inch (6-51 mm) for inner diameter $D_i$, and about 0.5-3 inch (13-76 mm) for outer diameter $D_o$, with an overall wall thickness, "T," therebetween which will depend on the hose size and pressure rating.

As may be seen in the different views of FIGS. 1 and 2, hose 10 is constructed as being formed about a tubular innermost layer, i.e., inner tube or core, 14, which may be of a single or multi-layer construction. In either construction, inner tube 14 has a circumferential outer core tube surface, 16, and a circumferential inner core tube surface, 18, which defines the inner diameter $D_i$ of the hose 10. A wall thickness is defined between the outer and inner core tube surfaces 16 and 18, as referenced at "t" in the cross-sectional view of FIG. 2. Such thickness t will depend on the hose size and otherwise on the desired pressure rating and liquid and/or gas permeation resistance.

Inner tube 14 may be provided as extruded or otherwise formed of a vulcanizable, chemically-resistant, synthetic rubber material. As used herein, "chemical resistance" should be understood to mean the ability to resist swelling, crazing, stress cracking, corrosion, or otherwise to withstand attack from organic fluids such as solvents and hydraulic fluids.

Suitable materials include acrylonitrile butadiene rubbers (NBR) and modified NBR's such as hydrogenated NBR (HNBR) and cross-linked NBR (XNBR), as well as copolymers and blends, thereof. Such blends may be, for example, XNBR or HNBR blended with one or more of a chlorinated polyethylene (CPE), polyvinyl chloride (PVC), or polychloroprene (CR).

The NBR or other rubber material may be formulated to have the properties listed in Table 1 below:

TABLE 1

| | |
|---|---|
| Durometer (Shore A), pts | 70-80 |
| Elongation @ Break (%) | 150-500 |
| Elastic Modulus @ 100% Strain (MPa) | 4.4-8.4 |
| Tensile Strength @ break (MPa) | 10.3-14.9 |
| Mooney Viscosity (ML 1 + 4) @ 100° C. (212° F.) | 62-82 |
| Mooney Scorch @ 121° C. (250° F.) Ts5 (mins) | >30 |
| Specific Gravity (kg/m3) | 1.25-1.31 |

Such properties of the rubber material provide the inner tube 14 with flexibility at low temperatures, while allowing for sufficient impulse pressure resistance. Such properties also provide the inner tube with sufficient crush resistance so as to be useable in conventional processes in the manufacture of the hose 10. Thus, the rubber material as so formulated provides the desired degree of low temperature flexibility without unduly compromising the manufacturability of hose 10, or its serviceability under high pressure conditions.

The rubber material as so provided may be compounded with between about 15-66% by total weight of the compound of one or more reinforcing fillers. Each of such fillers may be provided, independently, as a powder or as flakes, fibers, or other particulate form, or as a mixture of such forms. Typical of such reinforcing fillers include carbon blacks, clays, and pulp fibers. For powders, the mean average particle size of the filler, which may be a diameter, imputed diameter, screen, mesh, length, or other dimension of the particulate, may range between about 10-500 nm.

Additional fillers and additives may be included in the formulation of the rubber compound depending upon the requirements of the particular application envisioned. Such fillers and additives, which may be functional or inert, may include curing agents or systems, wetting agents or surfactants, plasticizers, processing oils and other aids, pigments, dispersants, dyes, and other colorants, opacifying agents, foaming or anti-foaming agents, anti-static agents, coupling agents such as titanates, chain extending oils, tackifiers, flow modifiers, pigments, lubricants, silanes, and other agents, stabilizers, emulsifiers, antioxidants, thickeners, and/or flame retardants. The formulation of the material may be compounded in a conventional mixing apparatus as an admixture of the rubber and filler components, and any additional fillers or additives.

With respect to the spiral-wound construction shown in FIGS. 1 and 2, at least two, and typically four (as shown) or up to six or more, reinforcement layers, 30*a-d*, are provided over the inner tube 14. Each of the reinforcement layers 30 may be conventionally formed as spiral, i.e., helically, wound of, for example, from 1 to about 180 ends of monofilament, continuous multi-filament, i.e., yarn, stranded, cord, thread, tape, or ply, or short "staple" strands of a fiber material. The fiber material, which may be the same or different in layers 30*a-d*, may be a natural or synthetic polymeric material such as a nylon, cotton, polyester, polyamide, aramid, polyolefin, polyvinyl alcohol (PVA), polyvinyl acetate, or polyphenylene benzobisoxazole (PBO), or blend, a steel, which may be stainless or galvanized, brass, zinc or zinc-plated, or other metal wire, or a blend thereof.

In the illustrated spiral wound construction 10 of FIGS. 1 and 2, which also may contain additional extruded, spiral, braided, and/or knitted layers (not shown), the reinforcement layers 30 are oppositely wound in pairs so as to counterbalance torsional twisting effects. For each of the spiral wound layers 30*a-d*, from 1 to about 180 parallel ends of, preferably, a monofilament metal or metal alloy wire, may be helically wound under tension in one direction, i.e., either left or right hand, with the next immediately succeeding layer 30 being wound in the opposite direction. The innermost reinforcement layer 30*a* may be wound as is shown in FIG. 1 directly over the outer surface 16 of inner tube 14, or over an intermediate textile, foil, or film or other layer.

As successively wound in the hose 10, the layers 30*a-d* each may have a predetermined pitched angle, referenced at $-\theta$ in FIG. 1 for layers 30*a* and 30*c*, and at $\theta$ for layers 30*b* and 30*d*, measured relative to the longitudinal axis 12 of the hose 10. For typical applications, the pitch angle $\theta$ will be selected to be between about 45-63°, but particularly may be selected depending upon the desired convergence of strength, elongation, weight, and volumetric expansion characteristics of hose 10. In general, higher pitch angles above about 54.7° exhibit decreased radial expansion of the hose under pressure, but increased axial elongation. For high pressure applications, a "neutral" pitch angle of about 54.7° generally is preferred as minimizing elongation to about ±3% of the original hose length. Each of the layers 30 may be wound at the same or different absolute pitch angle, and it is known that the pitch angles of respective reinforcement layers may be varied to affect the physical properties of the hose. In a preferred construction, however, the pitch angles of reinforcement layers 30*a-d* are provided to about the same, but as reversed in successive layers.

The tension and area coverage at which the reinforcement layers 30 are wound may be varied to achieve the desired flexibility. Such flexibility may be measured by bend radius, flexural forces, or the like, of the hose 10. In the illustrated construction which may be particularly adapted for high pressure hydraulic applications, each of the reinforcement layers 30*a-d* may be spiral wound from one end of a monofilament carbon or stainless steel wire having a generally circular cross-section. As so formed, each of the layers 30*a-d* thus may have a thickness of that of the wire diameter. Although a circular wire is shown, a "flat-wire" construction alternatively may be employed using wires having a rectangular, square, or other polygonal cross-section. Low profile oval or elliptical wires also may be used. To better control the elongation and contraction of hose 10, and for improved impulse fatigue life, the innermost reinforcement layer 30*a* may be bonded, by means of fusion, i.e., vulcanization of the inner tube 14, mechanical, chemical, or adhesive bonding, or a combination thereof or otherwise, to the outer surface 16 of the core tube 14.

The outermost reinforcement layer 30*d* may be sheathed within one or more layers of a coaxially-surrounding protective cover or jacket, referenced at 40, having a circumferential interior surface, 42, and an opposing circumferential exterior surface, 44, which defines the hose outer diameter $D_o$. Depending upon its construction, cover 40 may be spray-applied, dip coated, cross-head or co-extruded, or otherwise conventionally extruded, spiral or longitudinally, i.e., "cigarette," wrapped, or braided over the reinforcement layer 30*d* as, for example, a 0.02-0.15 inch (0.5-3.8 mm) thick layer of an fiber, glass, ceramic, or metal-filled, or unfilled, abrasion-resistant thermoplastic, i.e., melt-processible synthetic rubber such as chloroprene rubber (CR), or a CR copolymer or blend. By "abrasion-resistant," it is meant that such material for forming cover 40 may have a hardness of at least about 60 Shore A durometer.

The CR or other rubber material may be formulated to have the properties listed in Table 2 below:

TABLE 2

| | |
|---|---|
| Durometer (Shore A), pts | 60-75 |
| Elongation @ Break (%) | 270-370 |
| Elastic Modulus @ 100% Strain (MPa) | 2.0-4.4 |
| Tensile Strength @ break (MPa) | 10.9-15.9 |
| Mooney Viscosity (ML 1 + 4) @ 100° C. (212° F.) | 66-86 |
| Mooney Scorch @ 121° C. (250° F.) Ts5 (mins) | >30 |
| Specific Gravity (kg/m$^3$) | 1.40-1.46 |

Such properties of the rubber material provide the jacket with flexibility at low temperatures, while still having enough abrasion resistance to withstand normal usage conditions.

Any of the materials forming the cover 40 may be loaded with metal particles, carbon black, or other electrically-conductive particulate, flake, or fiber filler so as to render hose 10 electrically-conductive for static dissipation or other applications. Separate electrically-conductive fiber or resin layers (not shown), which may be in the form of spiral or "cigarette-wrapped" tapes or otherwise provided, also may be included in the hose construction 10 between the core 14 and the innermost reinforcement layer 30a, between the reinforcement layers 30, or between the outermost reinforcement layer 30d and cover 40.

Similar to the bonding of core 14 to the innermost reinforcement layer 30a, or to a textile or other layer therebetween, the interior surface 42 of cover 40 may be bonded to the outermost reinforcement layer 30d. Such bond, again, may be by fusion, chemical, mechanical, or adhesive means, or a combination thereof or other means.

Each of the reinforcement layers 30a-d within hose 10 may be bonded, such as chemically and/or mechanically, to its immediately succeeding layer 30 so as to provide for the more efficient transfer of induced internal or external stresses. Such bonding may be effected via the provision of a bonding agent in the form of an intermediate adhesive, resin, or other interlayer, 50a-c. In an illustrative embodiment, such bonding agent may be provided as an adhesive in the form of a melt-processible or vulcanizable material which is extruded or otherwise applied in a molten, softened, uncured or partially uncured, or otherwise flowable phase over each of the reinforcement layers 30a-d to form the respective interlayers 50a-c. Each such interlayer 50 may have a thickness of between about 1-25 mils (0.025-0.64 mm). The corresponding reinforcement layer 30 then may be wound over the corresponding interlayer 50 while it is still in its softened phase. Alternatively in the case of a thermoplastic interlayer 50, the layer may be reheated to effect its re-softening prior to the winding of reinforcement layer 30.

The material forming interlayers 50 specifically may be selected for low temperature performance, flexibility, or otherwise for compatibility with the reinforcement layers 30 and/or the inner tube 14 and cover 40. Suitable materials include natural and synthetic rubbers, as well as thermoplastic, i.e., melt-processible, or thermosetting, i.e., vulcanizable, resins which should be understood to also include, broadly, materials which may be classified as elastomers or hot-melts. Representative of such resins include plasticized or unplasticized polyamides such as nylon 6, 66, 11 and 12, polyesters, copolyesters, ethylene vinyl acetates, ethylene terpolymers, polybutylene or polyethylene terephthalates, polyvinyl chlorides, polyolefins, fluoropolymers, thermoplastic elastomers, engineering thermoplastic vulcanizates, thermoplastic hot-melts, copolymer rubbers, blends such as ethylene or propylene-EPDM, EPR, or NBR, polyurethanes, and silicones. In the case of thermoplastic resins, such resins typically will exhibit softening or melting points, i.e., Vicat temperatures, of between about 77-250° C. For amorphous or other thermoplastic resins not having a clearly defined melting peak, the term melting point also is used interchangeably with glass transition point.

With each of the respective layers 14, 30a, 50a, 30b, 50b, 30c, 50c, 30d, and 40 being extruded, wound, or otherwise formed sequentially in such order, following the application of the cover 40, the hose 10 may be heated to vulcanize the rubber layers and thereby consolidate the construction into an integral hose structure.

Thus, an illustrative rubber hose construction is described which is resistant to low temperatures while maintaining its flexibility. Such construction may be adapted to meet a variety of industrial standards specifying service temperatures ranging from about −57° C. (−70° F.) to +100° C. (+212° F.) and maximum service pressures exceeding about 28.0 MPa (4,000 psi) and up to about 56.0 MPa (8,000 psi). As such, the hose construction may be used in a variety of mobile or industrial hydraulic installations, or otherwise in a variety of pneumatic, vacuum, shop air, general industrial, maintenance, and automotive applications such as for air, oil, antifreeze, and fuel.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. A hose for use at a service temperature range of between about −57° C. (−70° F.) and about +100° C. (+212° F.) and a service pressure range of between about 28.0 MPa (4000 psi) and up to about 56.0 MPa (8000 psi) comprising:
   an inner tubular core comprising a layer of a first rubber compound comprising an acrylonitrile butadiene rubber (NBR) or a copolymer or blend thereof having an elastic modulus of not greater than about 8.4 MPa (1200 psi);
   at least a first pair of spiral wound reinforcement layers surrounding the core comprising a first reinforcement layer and a second reinforcement layer surrounding the first reinforcement layer; and
   an outer jacket surrounding the second reinforcement layer comprising a layer of a second rubber compound having a durometer of not greater than about 75 Shore A.

2. The hose of claim 1 wherein:
   the first reinforcement layer comprises one or more filaments of a first metal or metal alloy wire; and
   the second reinforcement layer lines comprise one or more filaments of a second metal or metal alloy wire fiber the same as or different than the first metal or metal alloy wire.

3. The hose of claim 1 wherein:
   the first reinforcement layer is spiral wound in a first winding direction; and
   the second reinforcement layer is spiral wound in a second winding direction opposite the first winding direction.

4. The hose of claim 1 wherein the hose has a central longitudinal axis and:
   the first reinforcement layer is laid at positive angle relative to the longitudinal axis; and the second reinforcement layer is laid at a negative angle relative to the longitudinal axis.

5. The hose of claim 1 wherein the second rubber compound comprises an chloroprene rubber (CR) or a copolymer or blend thereof.

6. The hose of claim 1 wherein the first rubber compound has an elastic modulus of not less than about 3.4 MPa (500 psi).

7. The hose of claim 1 wherein the first rubber compound has a durometer of not greater than about 80 Shore A and not less than about 70 Shore A.

8. The hose of claim 1 wherein the second rubber compound has a durometer of not less than about 60 Shore A.

9. A method of conveying fluid or pressure at a service temperature of between about −57° C. (−70° F.) and about +100° C. (+212° F.) and a service pressure of between about 28.0 MPa (4000 psi) and about 56.0 MPa (8000 psi) comprising the steps of:
  (a) providing a length of a hose comprising:
    an inner tubular core comprising a layer of a first rubber compound comprising an acrylonitrile butadiene rubber (NBR) or a copolymer or blend thereof having an elastic modulus of not greater than about 8.4 MPa (1200 psi);
    at least a first pair of spiral wound first reinforcement layer surrounding the core comprising a first reinforcement layer and a second reinforcement layer surrounding the first reinforcement layer;
    an outer jacket surrounding the second reinforcement layer comprising a layer of a second rubber compound having a durometer of not greater than about 75 Shore A; and
  (b) conveying fluid or pressure through the hose at a service temperature of between about −57° C. (−70° F.) and about +100° C. (+212° F.).

10. The method of claim 9 wherein:
  the first reinforcement layer comprises one or more filaments of a first metal or metal alloy wire; and
  the second reinforcement layer lines comprise one or more filaments of a second metal or metal alloy wire fiber the same as or different than the first metal or metal alloy wire.

11. The method of claim 9 wherein:
  the first reinforcement layer is spiral wound in a first winding direction; and
  the second reinforcement layer is spiral wound in a second winding direction opposite the first winding direction.

12. The method of claim 9 wherein the hose has a central longitudinal axis and:
  the first reinforcement layer is laid at positive angle relative to the longitudinal axis; and
  the second reinforcement layer is laid at a negative angle relative to the longitudinal axis.

13. The method of claim 9 wherein the second rubber compound comprises an chloroprene rubber (CR) or a copolymer or blend thereof.

14. The method of claim 9 wherein the first rubber compound has an elastic modulus of not less than about 3.4 MPa (500 psi).

15. The method of claim 9 wherein the first rubber compound has a durometer of not greater than about 80 Shore A and not less than about 70 Shore A.

16. The method of claim 9 wherein the second rubber compound has a durometer of not less than about 60 Shore A.

* * * * *